(12) United States Patent
Sheahan

(10) Patent No.: US 9,602,027 B2
(45) Date of Patent: Mar. 21, 2017

(54) SYSTEMS, METHODS, AND ASSEMBLIES FOR DETECTING STOPPAGE OF ELECTRIC MOTORS

(71) Applicant: Nidec Motor Corporation, St. Louis, MO (US)

(72) Inventor: Thomas J. Sheahan, Cary, IL (US)

(73) Assignee: Nidec Motor Corporation, St. Louis, MO (US)

( * ) Notice: Subject to any disclaimer, the term of this patent is extended or adjusted under 35 U.S.C. 154(b) by 102 days.

(21) Appl. No.: 14/559,448

(22) Filed: Dec. 3, 2014

(65) Prior Publication Data

US 2015/0084568 A1 Mar. 26, 2015

Related U.S. Application Data

(63) Continuation of application No. 13/681,100, filed on Nov. 19, 2012, now Pat. No. 8,907,600.

(51) Int. Cl.
*H02P 3/06* (2006.01)
*H02P 3/24* (2006.01)
*H02P 6/24* (2006.01)
*H02P 3/02* (2006.01)

(52) U.S. Cl.
CPC ............... *H02P 3/06* (2013.01); *H02P 3/02* (2013.01); *H02P 6/24* (2013.01)

(58) Field of Classification Search
CPC ........................................................ H02P 3/24
USPC ................ 318/373–378, 757, 759, 760, 761
See application file for complete search history.

(56) References Cited

U.S. PATENT DOCUMENTS

| | | | | |
|---|---|---|---|---|
| 4,587,468 A | * | 5/1986 | Hotta | H02P 6/24 318/254.1 |
| 4,916,370 A | * | 4/1990 | Rowan | H02P 3/18 318/368 |
| 5,032,781 A | * | 7/1991 | Kronenberg | G01R 7/06 318/685 |

* cited by examiner

*Primary Examiner* — Bentsu Ro
(74) *Attorney, Agent, or Firm* — Hovey Williams LLP

(57) ABSTRACT

A motor controller for an electric motor having a stator and a rotor. The motor controller includes a power input for receiving AC power from a power source; a control input for receiving a control signal from a control; and circuitry for switching power from the power source to the electric motor in response to the control signal. The circuitry is operable to: apply a driving waveform to the stator to cause rotation of the rotor; remove the driving waveform from the stator to cause the rotor to coast and eventually stop; apply a stop detection waveform to the stator while the rotor is coasting, wherein the stop detection waveform induces a waveform on the rotor which in turn induces a waveform back to the stator while the rotor is rotating; and monitor the stator to detect a characteristic of the waveform induced back to the stator to detect when the rotor has substantially stopped rotating.

20 Claims, 3 Drawing Sheets

SYSTEMS, METHODS, AND ASSEMBLIES FOR DETECTING STOPPAGE OF ELECTRIC MOTORS

RELATED APPLICATION

This is a continuation of U.S. application Ser. No. 13/681,100, filed Nov. 19, 2012, entitled SYSTEMS, METHODS, AND ASSEMBLIES FOR DETECTING STOPPAGE OF ELECTRIC MOTORS, which is hereby incorporated by reference into the present application in its entirety.

BACKGROUND

Electric motors commonly include a stationary component called a stator and a rotating component called a rotor. The rotor rotates within (or around) the stator when the motor is energized with a driving waveform. When the driving waveform is removed from the motor, the rotor may coast to a standstill over time due to the inertia of the rotor and anything coupled to the rotor.

In many motor applications, it is desirable to determine when a motor's rotor has stopped rotating so the rotor can be driven in the opposite direction, at a different speed, etc. For example, in washing machine applications, it is desirable to know when the washing drum motor has stopped rotating after a high speed spin cycle so that the washing machine may be unloaded or switched to a slower speed wash or rinse cycle.

Motor shaft sensors such as Hall effect sensors are often used to detect motor stoppage. However, such sensors increase the cost and complexity of motors and are therefore not desirable for many lower cost applications such as washing machine motors.

Sensorless techniques have also been developed for detecting motor stoppage. Such techniques typically employ various algorithms for estimating when a rotor stops based on measured electrical parameters. Unfortunately, such techniques are less accurate or don't work at all when a motor is being initially powered-up or braked or when the motor experiences a fault condition.

Simple time delay circuits are also often used to ensure motor stoppage. Such circuits require that a selected time period lapse after a driving waveform is removed from the motor before the rotor is assumed to be stopped. This unfortunately wastes time because the time delay is often longer than necessary to account for the maximum possible coast time of the motor.

The above section provides background information related to the present disclosure which is not necessarily prior art.

SUMMARY

Embodiments of the present invention solve the above described problems by providing improved systems, methods, and motor assemblies for determining when the rotor of an electric motor has stopped rotating.

A motor assembly constructed in accordance with an embodiment of the present invention may be used in a washing machine, HVAC system, pump system or any other application and broadly comprises an electric motor and a motor controller for powering and controlling the motor. The motor may employ any motor technology and includes a stator and a rotor. In one embodiment, the motor may be a three phase AC induction motor.

The motor controller powers and controls the motor and is programmed or otherwise configured to perform at least some of the methods and functions described herein. In one embodiment, the motor controller is programmed or configured to apply a driving waveform to the stator to cause rotation of the rotor and to subsequently remove the driving waveform from the stator to cause the rotor to coast and eventually stop. The motor controller then applies a stop detection waveform to the stator while the rotor is coasting. The stop detection waveform induces a waveform on the rotor which in turn induces a waveform back to the stator. The waveform induced back to the stator has a frequency proportional to the rotational speed of the rotor. The motor controller monitors the stator to detect a characteristic of the waveform induced back to the stator to detect when the rotor has substantially stopped rotating.

In one embodiment, the detected characteristic of the waveform induced back to the stator may be an amplitude of the waveform. The circuitry detects that the rotor has substantially stopped rotating when the amplitude of the waveform induced back to the stator approaches zero. In another embodiment, the detected characteristic of the waveform induced back to the stator may be a frequency of the waveform. The circuitry detects that the rotor has substantially stopped rotating when the frequency of the waveform induced back to the stator approaches zero.

The motor or the motor controller may also include one or more current shunts. The motor controller may be programmed or configured to monitor a current through one of the current shunts to detect the above-described characteristic to determine whether the rotor has substantially stopped rotating.

The motor controller may also apply a DC injection braking waveform to the stator while the rotor is coasting to brake the motor. The motor controller may remove the applied braking waveform from the stator once it determines the rotor has stopped rotating as described above.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

Embodiments of the present invention are described in detail below with reference to the attached drawing figures, wherein.

Figure 1:
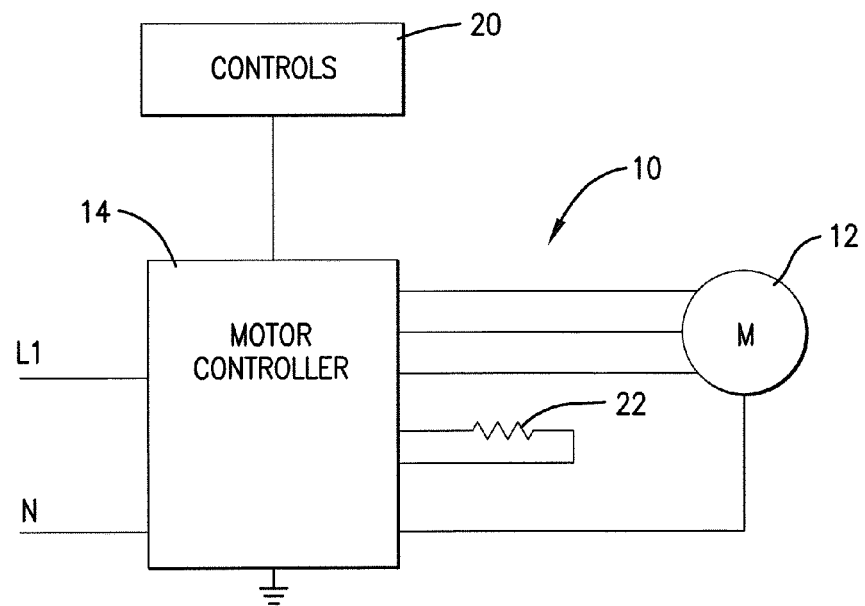
FIG. 1 is a block diagram of a motor assembly constructed in accordance with an embodiment of the invention.

The drawing figures do not limit the present invention to the specific embodiments disclosed and described herein.

The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and initially FIG. 1, a motor assembly 10 constructed in accordance with embodiments of the invention is illustrated. The motor assembly 10 may be used in any application, such as in a washing machine, HVAC system, pump system, or appliance. In one particular embodiment, the motor assembly 10 is designed for use with a horizontal axis, front-loading washing machine, but the principles of the present invention are equally applicable to all uses of the motor assembly.

An embodiment of the motor assembly 10 broadly includes an electric motor 12 and a motor controller 14. The motor assembly 10 may also include or be coupled with other systems or components not relevant to the present invention.

Figure 2:
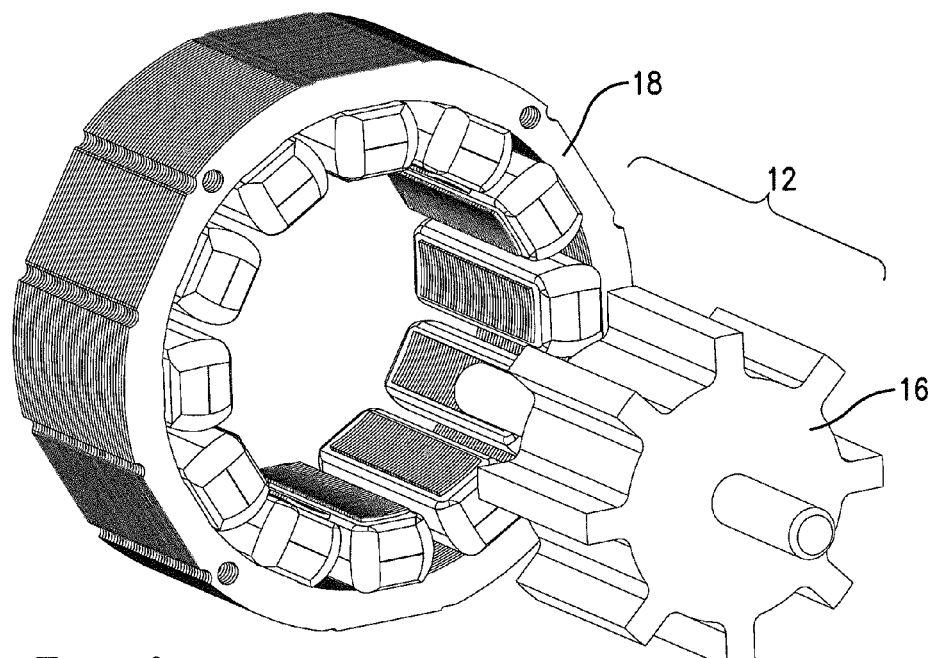
FIG. 2 is a schematic representation of the stator and rotor of the motor in the motor assembly of FIG. 1.

As best illustrated in FIG. 2, the electric motor 12 includes a rotor 16 and a stator 18. The motor 12 may operate on direct current (DC) or alternating current (AC), may be synchronous or asynchronous, and may be single phase or three phase. The motor 12 may be of any type, including but not limited to, a brushed DC motor, a coreless or ironless DC motor, a series wound universal motor, an induction motor, a torque motor, or a stepper motor. Moreover, the motor may be fixed speed, multi-speed, or variable speed and may have any horsepower (HP) rating. In one particular embodiment of the invention, the motor 12 is a ⅓-1 HP, three phase, reversible and variable speed induction motor. Such a motor provides maximum drive performance at a competitive price for washing machine applications which require a wide range of operating speeds and a high start-up torque. However, the principles of the present invention are not limited to any particular motor type, technology, or size.

The motor controller 14 provides power to and controls operation of the electric motor 12 and is programmed or otherwise configured to perform one or more of the functions or methods described below. As shown in FIG. 1, the motor controller 14 may receive power from a single phase AC supply voltage at 115 VAC supplied by connections L1 and N, where L1 represents the "hot" side of the AC supply and N represents neutral, which is typically at earth potential. The AC supply voltage may also be 230 VAC, in which case the neutral line would be replaced with another hot supply line. The AC supply voltage may also be three phase 480 VAC.

The motor controller 14 may include any combination of circuitry, hardware, firmware, and/or software. In one particular embodiment, the motor controller 14 includes a custom application specific integrated circuit (ASIC) with a microprocessor that controls and drives a 3-phase inverter that provides a three phase driving waveform to the coils of the stator 18. The motor controller may also include various other electronic components.

The motor controller 14 may receive commands or operating instructions from one or more controls 20 such as a keypad, switches, or buttons as are commonly found on washing machines and other appliances and devices. The controls 20 may be one or more separate components or may be integrated in the motor controller 14.

The motor controller 14 may also be coupled to one or more current shunts 22 for detecting electrical characteristics of the stator 18 as described below. Each current shunt 22 may be a discrete component coupled to the printed circuit board of the motor controller ASIC or may be incorporated in the stator of the motor or the inverter module of the motor controller.

Aspects of the invention may be implemented with one or more computer programs stored in or on computer-readable medium residing on or accessible by the microprocessor of the motor controller 14. Each computer program preferably comprises an ordered listing of executable instructions for implementing logical functions in the motor controller 14. Each computer program can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

According to one aspect of this disclosure, the motor controller 14 is programmed or otherwise configured to detect stoppage of the electric motor 12. The motor controller 14 applies a driving waveform to the stator 18 to cause rotation of the rotor 16 and subsequently removes the driving waveform to cause the rotor to coast and eventually stop. The motor controller 14 then applies a stop detection waveform to the stator 18 while the rotor 16 is coasting. The stop detection waveform induces a waveform on the rotor 16 which in turn induces a waveform back to the stator 18. The waveform induced back to the stator 18 has a frequency proportional to the rotational speed of the rotor 16. The motor controller 14 monitors the stator to detect a characteristic of the waveform induced back to the stator 18 to detect when the rotor 16 has substantially stopped rotating.

Figure 3:
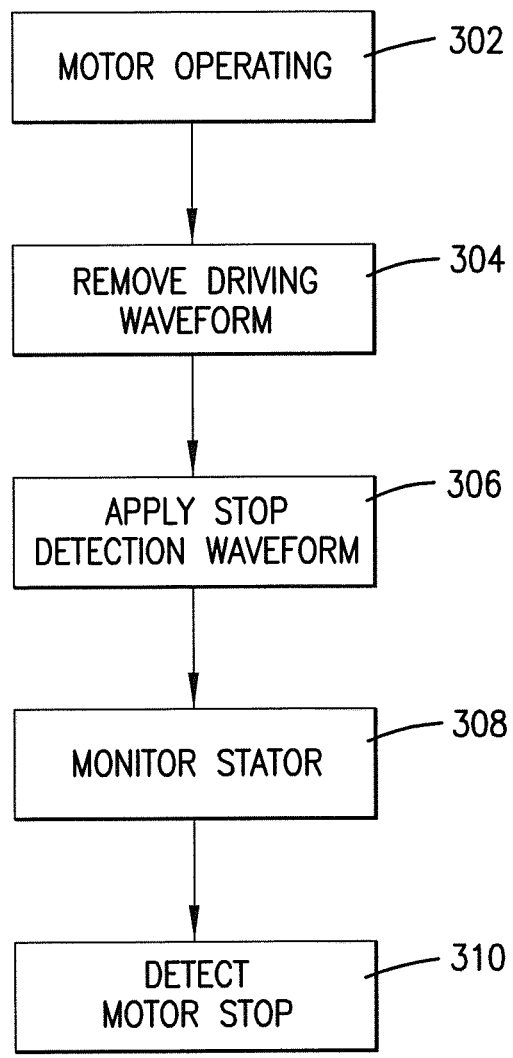
FIG. 3 is a flow diagram depicting steps in a method of the invention and/or code segments of a computer program of the invention.

The flow chart of FIG. 3 shows the functionality and operation of an embodiment of the invention in more detail. In this regard, some of the blocks of the flow chart may represent steps in a method 300 and/or a module segment or portion of code of the computer programs. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

The method 300 begins while the motor controller 14 is applying a driving waveform to the stator 18 to rotate the rotor 16 as depicted in box 302. For example, in the embodiment in which the motor assembly 10 is used in a washing machine, the motor controller 14 may be operating the rotor 16 at a high RPM during a spin cycle.

The motor controller 14 may subsequently remove the driving waveform from the stator 18 as depicted in box 304. This may be done in response to a signal from the controls 20 and/or an internal program or signal in the motor controller. Once the driving waveform is removed, the rotor begins to coast and eventually stops.

To determine when the rotor 16 has stopped rotating, the motor controller 14 applies a stop detection waveform to the stator 18 while the rotor 16 is coasting as depicted in step 306. In one embodiment, the stop detection waveform is a fixed, low amplitude, high frequency current signal applied to each phase of the stator 18. Each phase of this stop detection waveform may be 120 degrees apart within one pulse-width modulation (PWM) period. In one embodiment, the stop detection waveform has a frequency of about 16 KHz. If all three phases of the stator are lined up at a 50% duty cycle, then all motor leads are biased at the half bus voltage level and no current flows. Shifting the phases creates the small stop detection waveform. If a stop detection waveform of greater current is needed, a different duty cycle may be set on each phase of the stator.

The stop detection waveform induces a waveform on the rotor 16 which in turn induces a waveform back to the stator 18. The waveform induced back to the stator has a frequency proportional to the rotational speed of the rotor 16. This results in a combined current waveform on the stator that consists of the waveform induced back to the stator riding on top of the stop detection waveform applied to the stator.

The motor controller monitors the stator to detect a characteristic of the combined current waveform on the stator to detect when the rotor has substantially stopped rotating.

In one embodiment, the detected characteristic of the combined current waveform is its amplitude. Namely, the motor controller 14 monitors the combined peak-to-peak value of the combined current waveform on the stator and compares it to the peak-to-peak value of the waveform on the stator when the rotor is stopped. If the monitored peak-to-peak value is greater, the rotor is still moving. In other words, the circuitry detects that the rotor has substantially stopped rotating when the amplitude of the waveform induced back to the stator approaches zero.

In another embodiment, the circuitry detects that the rotor 16 has substantially stopped rotating when the frequency of the waveform induced back to the stator 18 approaches zero.

The motor 12 or the motor controller 14 may also include one or more current shunts 22. The motor controller may be programmed or configured to monitor a current through one of the current shunts to detect the above-described characteristic to determine whether the rotor has substantially stopped rotating.

The above-described method 300 provides numerous advantages. By determining when the rotor 16 has substantially stopped rotating, the throughput of a device driven by the electric motor 12 may be increased. For example, when the motor assembly 10 is used in a washing machine, the method 300 can quickly and cost-effectively determine when the motor has stopped rotating after a high speed spin cycle so that the washing machine can be unloaded or operated in a different cycle.

Figure 4:
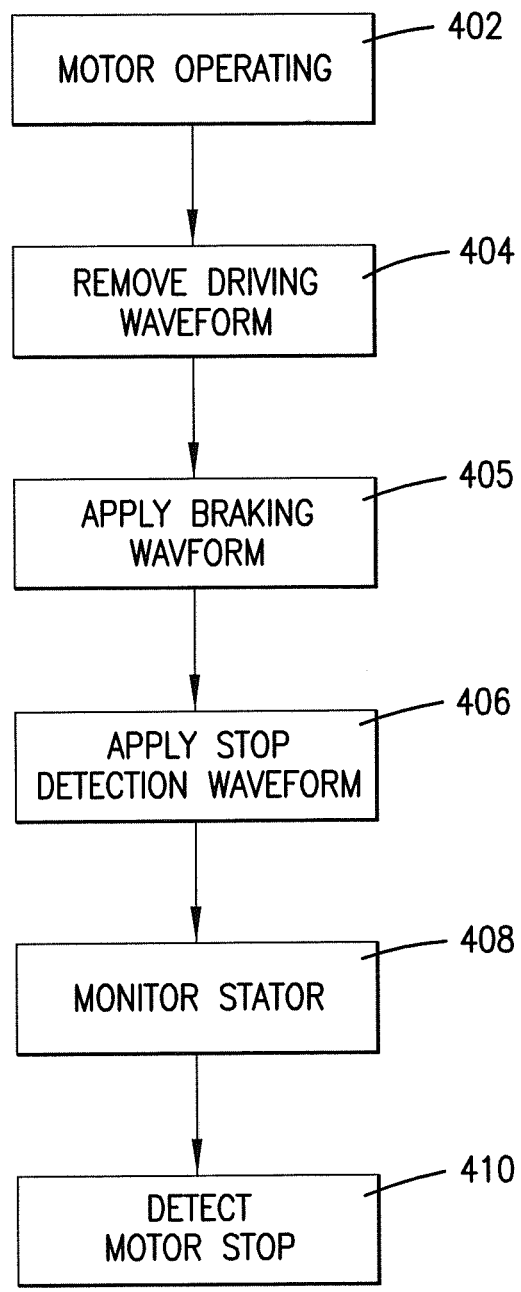
FIG. 4 is a flow diagram depicting steps in another method of the invention and/or code segments of a computer program of the invention.

The flow chart of FIG. 4 shows the functionality and operation of a similar embodiment of the invention. In this regard, some of the blocks of the flow chart may represent steps in a method 400 and/or a module segment or portion of code of the computer programs. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved.

Steps 402, 404, 406, 408, and 410 of the method 400 are substantially identical to steps 302, 304, 306, 308, and 310 of the method 300 and therefore will not be described again. In addition to these steps, the method 400 includes step 405 to brake the rotor.

After the motor controller 14 removes the driving waveform from the stator 18 and the rotor 16 begins to coast, the motor controller 14 may receive or internally process a brake signal. For example, the motor controller 14 may receive a signal from an internal or external timing circuit that indicates a spin cycle or other motor cycle has ended and that the rotor should be slowed or stopped.

In response to the brake signal or other indication that the motor 12 has been de-energized, the motor controller 14 may energize the stator 18 to apply a braking force to the rotor in order to brake the rotor as depicted in box 405. The braking force may be provided by DC injection braking in which a direct current (DC) voltage is applied to a motor's stator windings to brake the rotor. The DC voltage creates a stationary magnetic field which applies a static torque to the rotor. This slows and eventually halts rotation of the rotor. As long as the DC voltage remains on the stator windings, the rotor is held in position and resists rotation. DC injection braking is relatively simple, cost-effective, and maintenance free and is therefore a popular choice of braking for many motor applications. The braking waveform applied to the stator may be a controlled current waveform, a voltage controlled waveform, or any other waveform.

Although the invention has been described with reference to the preferred embodiment illustrated in the attached drawing figures, it is noted that equivalents may be employed and substitutions made herein without departing from the scope of the invention as recited in the claims. For example, in some embodiments the above-described induction motor is instead a permanent magnet motor. For such motors, no signal is induced on the rotor because the rotor has no coils. Instead, the moving rotor induces a voltage or current on the stator. Specifically, the stator coil picks up flux from the moving rotor magnet which induces a signal on the stator coil. The motor controller determining rotation of the rotor by monitoring this signal on the stator.

Having thus described the preferred embodiment of the invention, what is claimed as new and desired to be protected by Letters Patent includes the following:

1. A motor controller for an electric motor having a stator and a rotor, the motor controller comprising:
   a power input for receiving power from a power source; and
   circuitry for switching power from the power source to the electric motor, wherein the circuitry is operable to:
      apply a driving waveform to the stator to cause rotation of the rotor;
      remove the driving waveform from the stator to cause the rotor to coast and eventually stop;
      apply a stop detection waveform to the stator while the rotor is coasting, wherein the stop detection waveform has no braking effect on the rotor, and wherein the stop detection waveform induces a waveform on the rotor which in turn induces a waveform back to the stator while the rotor is rotating; and
      monitor the stator to detect a characteristic of the waveform induced back to the stator as a result of applying the stop detection waveform to detect when the rotor has substantially stopped rotating.

2. The motor controller of claim 1, wherein the detected characteristic of the waveform induced back to the stator is an amplitude of the waveform.

3. The motor controller of claim 2, wherein the circuitry detects that the rotor has substantially stopped rotating when the amplitude of the waveform induced back to the stator approaches zero.

4. The motor controller of claim 1, wherein the detected characteristic of the waveform induced back to the stator is a frequency of the waveform.

5. The motor controller of claim 4, wherein the circuitry detects that the rotor has substantially stopped rotating when the frequency of the waveform induced back to the stator approaches zero.

6. The motor controller of claim 1, wherein the electric motor or motor controller includes one or more current shunts, and wherein the motor controller is operable to monitor a current through one of the current shunts to detect the characteristic of the waveform induced back to the stator.

7. The motor controller of claim 1, further comprising a control input for receiving a control signal from a control device to signal the circuitry to apply the stop detection waveform.

8. The motor controller of claim 1, wherein the stop detection waveform is a high frequency AC signal or a DC signal.

9. The motor controller of claim 8, wherein the high frequency AC or DC signal has a frequency of about 16 kHz.

10. A motor controller for an electric induction motor having a stator and a rotor, the motor controller comprising:
    a power input for receiving AC power from a power source;
    a control input for receiving a control signal from a control device;
    circuitry for switching power from the power source to the electric induction motor in response to the control signal, wherein the circuitry is operable to:
       apply a driving waveform to the stator to cause rotation of the rotor;
       remove the driving waveform from the stator to cause the rotor to coast and eventually stop;
       apply a stop detection waveform in the form of a low amplitude, high frequency current signal to the stator while the rotor is coasting, wherein the stop detection waveform has no braking effect on the rotor, and wherein the stop detection waveform induces a waveform on the rotor which in turn induces a waveform back to the stator while the rotor is rotating; and
       monitor the stator to detect a characteristic of the waveform induced back to the stator as a result of applying the stop detection waveform to detect when the rotor has substantially stopped rotating.

11. The motor controller of claim 10, wherein the detected characteristic of the waveform induced back to the stator is an amplitude of a current of the waveform.

12. The motor controller of claim 10, wherein the detected characteristic of the waveform induced back to the stator is a frequency of a current of the waveform.

13. The motor controller of claim 10, wherein the electric induction motor or motor controller includes one or more current shunts, and wherein the motor controller is operable to monitor a current through one of the current shunts to detect the characteristic of the waveform induced back to the stator.

14. The motor controller of claim 10, wherein the circuitry is further operable to apply a braking waveform to the stator after the driving waveform has been removed.

15. A motor controller for an electric motor having a stator and a rotor, the motor controller comprising:
    a power input for receiving power from a power source; and
    circuitry for switching power from the power source to the electric motor, wherein the circuitry is operable to:
       remove a driving waveform from the stator to cause a rotation of the rotor to eventually stop;
       apply a braking waveform to the stator to slow the rotation of the rotor;
       apply a stop detection waveform to the stator, wherein the stop detection waveform is distinct from the braking waveform, and wherein the stop detection waveform induces a waveform on the rotor which in turn induces a waveform back to the stator while the rotor is rotating; and
       monitor the stator to detect a characteristic of a current of the waveform induced back to the stator as a result of applying the stop detection waveform to detect when the rotor has substantially stopped rotating.

16. The motor controller of claim 15, wherein the detected characteristic of the waveform induced back to the stator is an amplitude of the current of the waveform, and the circuitry detects that the rotor has substantially stopped rotating when the amplitude of the current of the waveform induced back to the stator approaches zero.

17. The motor controller of claim 15, wherein the detected characteristic of the waveform induced back to the stator is a frequency of the current of the waveform, and the circuitry detects that the rotor has substantially stopped rotating when the frequency of the current of the waveform induced back to the stator approaches zero.

18. The motor controller of claim 15, wherein the motor or motor controller includes one or more current shunts, and wherein the motor controller is operable to monitor a current through one of the current shunts to detect the characteristic of the waveform induced back to the stator.

19. The motor controller of claim 15, wherein the stop detection waveform is a high frequency AC signal or a DC signal.

20. The motor controller of claim 19, wherein the high frequency AC or DC signal has a frequency of about 16 kHz.

* * * * *